Sept. 4, 1956     F. N. ZAUNBRECHER     2,761,262
GRAIN COMBINE CONCAVE RECONDITIONER
Filed Nov. 28, 1952     3 Sheets-Sheet 1
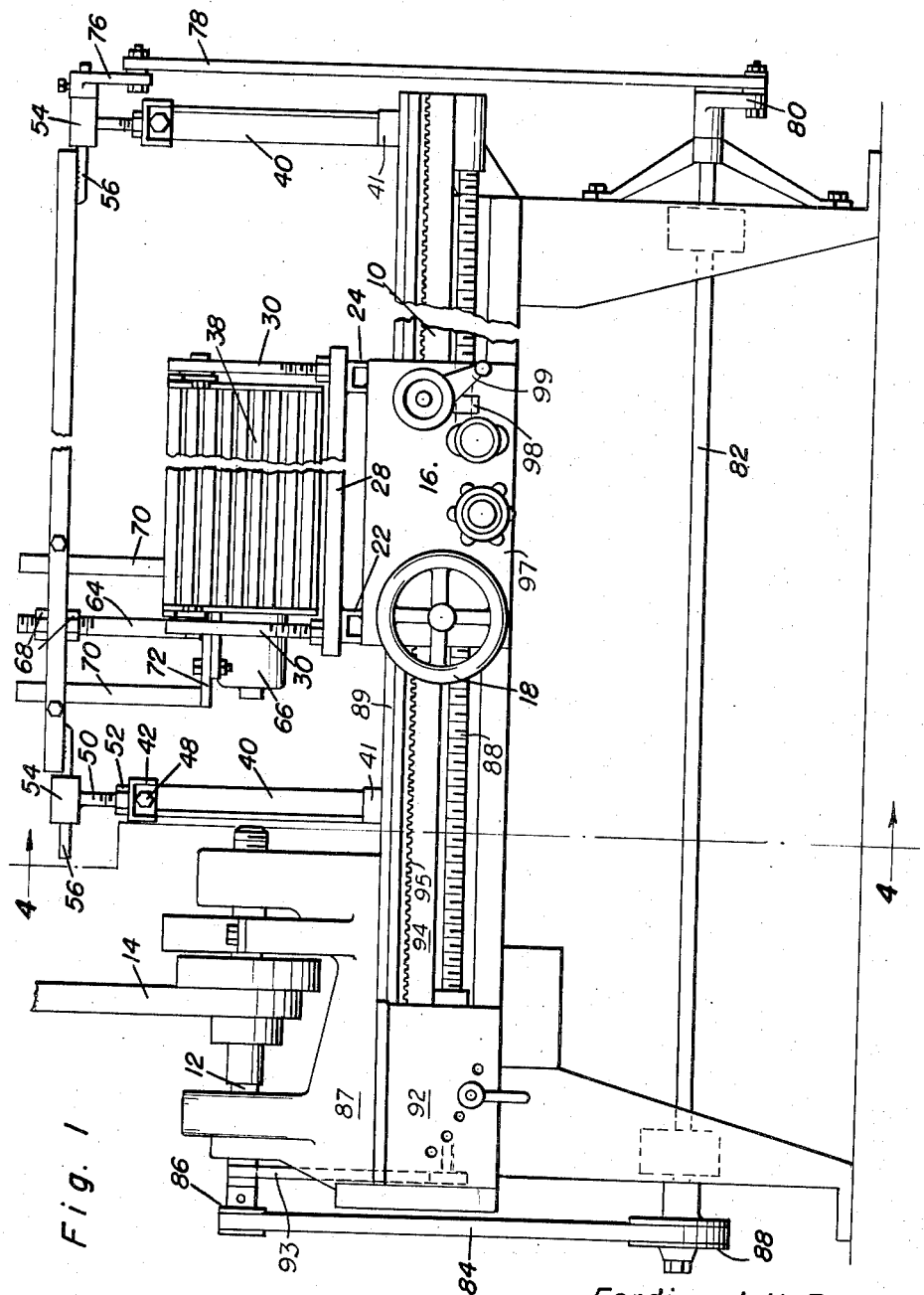
Ferdinand N. Zaunbrecher
INVENTOR.

Sept. 4, 1956  F. N. ZAUNBRECHER  2,761,262
GRAIN COMBINE CONCAVE RECONDITIONER
Filed Nov. 28, 1952  3 Sheets-Sheet 2
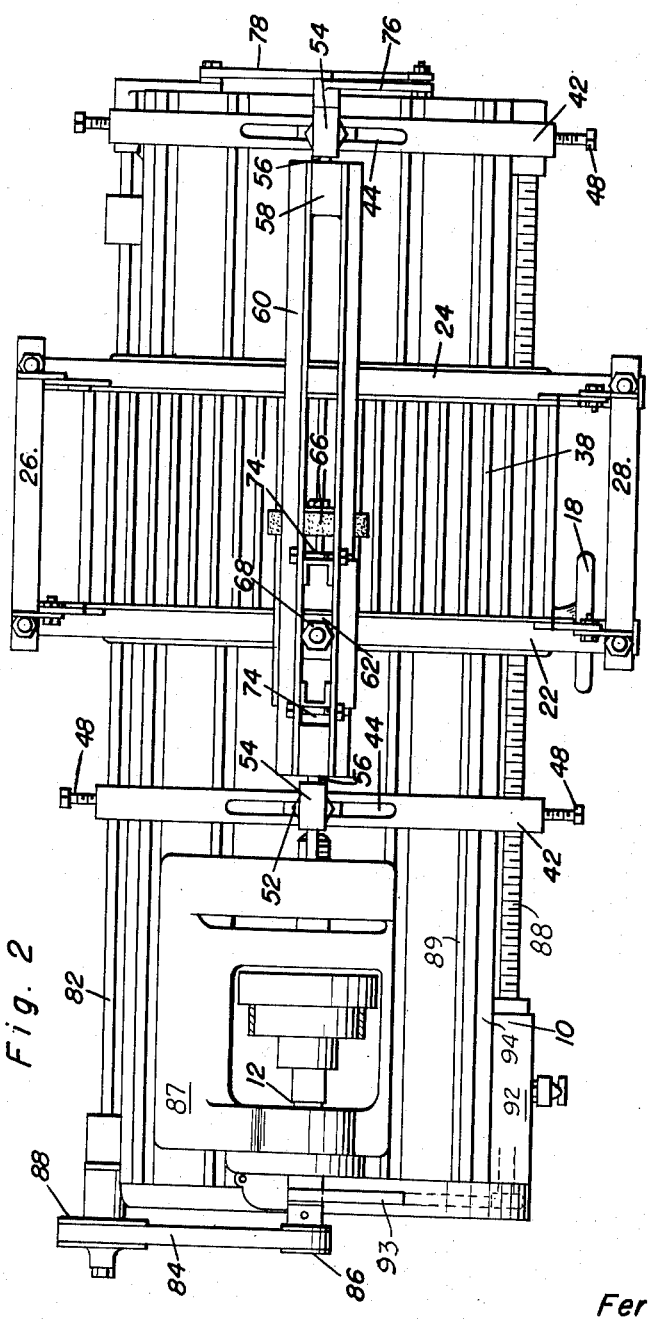
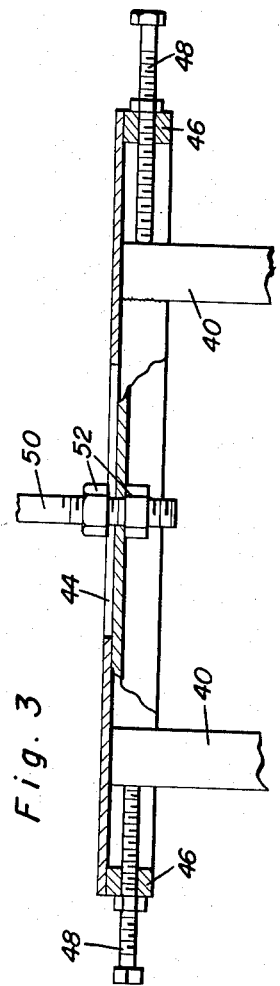
Ferdinand N. Zaunbrecher
INVENTOR.
BY Clarence A. O'Brien
and Harvey B. Jacobson
Attorneys Sept. 4, 1956   F. N. ZAUNBRECHER   2,761,262
GRAIN COMBINE CONCAVE RECONDITIONER
Filed Nov. 28, 1952   3 Sheets-Sheet 3

Ferdinand N. Zaunbrecher
INVENTOR.

United States Patent Office 2,761,262
Patented Sept. 4, 1956

2,761,262

GRAIN COMBINE CONCAVE RECONDITIONER

Ferdinand N. Zaunbrecher, Rayne, La., assignor of one-third to James Domengeaux, Lafayette, La.

Application November 28, 1952, Serial No. 322,944

10 Claims. (Cl. 51—259)

This invention relates to a device for reconditioning worn concaves of grain combines.

The concave of a grain combine is used as a bed in combination with a rotary thresher so as to separate grain from the stalk. During normal use, the arcuately arranged transverse bars of the concave become worn. In order to remove the grain from the stalks, it is necessary that the transverse members be substantially square in shape and that worn and rounded corners be removed by reconditioning. It is, therefore, the primary object of this invention to provide a device particularly adapted to be used for reconditioning concaves of grain combines.

Still another object of the invention resides in the provision of means for longitudinally, transversely, vertically, and pivotally mounting a grinder above a work piece.

Other objects and features of the invention reside in the provision of a device adapted to be installed on a lathe or any other suitable support base for reconditioning concaves of grain combines that is strong, durable, highly efficient in operation, capable of performing its function in a novel and highly advantageous manner, and in which is relatively simple for one skilled in the art to use.

These, together with the various ancillary objects of the invention which will become apparent as the following description proceeds, are attained by this reconditioner for grain combine concaves, a preferred embodiment of which has been illustrated in the accompanying drawings, by way of example only, wherein:

Figure 1 is a front elevational view of the invention shown in operative emplacement on a conventional lathe;

Figure 2 is a top plan view showing the invention as emplaced on a lathe with a work piece installed;

Figure 3 is an enlarged vertical sectional view showing the construction of the means for transversely adjusting the device relative to the lathe and for transversely adjusting the grinder relative to the work piece;

Figure 4:
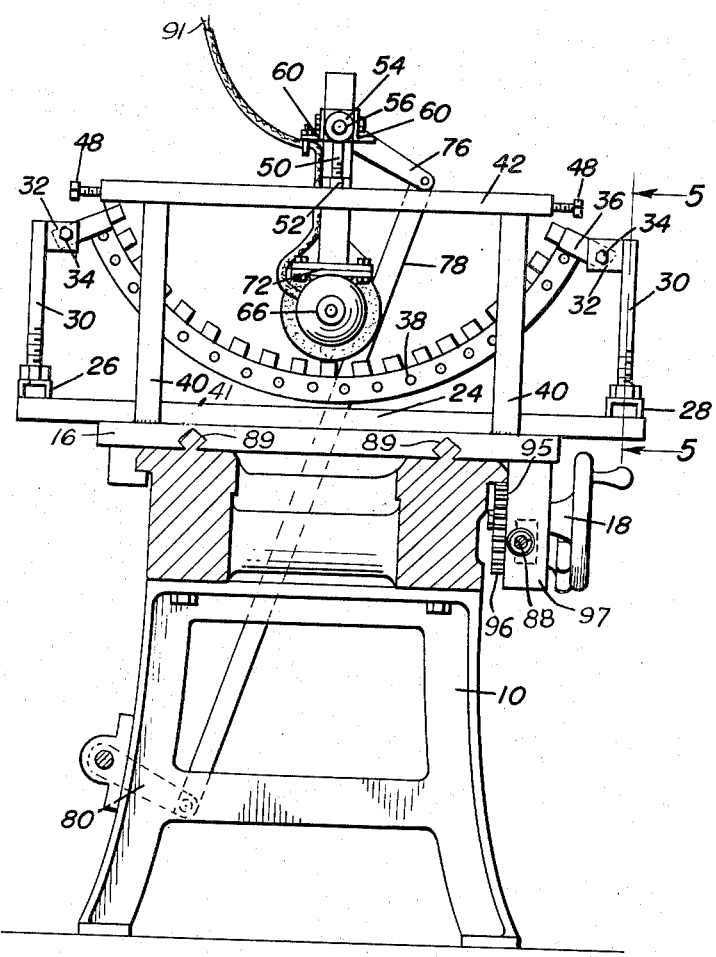
Figure 4 is a vertical sectional view as taken along the plane of line 4—4 in Figure 1, and showing in particular the means for swinging the grinder in a suitable arc.
Figure 5:
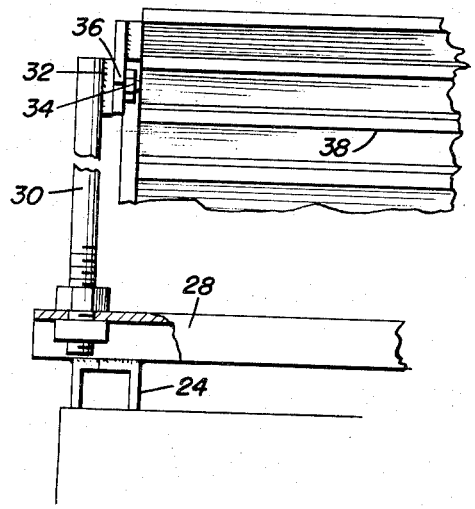
Figure 5 is a vertical sectional detail as taken along the plane 5—5 in Figure 4, showing the construction of the means for mounting the work piece.

With continuing reference to the accompanying drawings wherein like reference numerals designate similar parts throughout the various views, the reference numeral 10 generally designates a support structure which may be a conventional lathe which has on one end a conventional gear-box 92 and headstock 87 in which is journalled the usual drive shaft 12 which is driven by an endless belt 14 from a prime mover. A conventional lead screw 88 having one end journalled in the other end of the lathe has its other end supported to be driven by the transmission of the gear-box 92 which is in turn driven by a connection means shown diagrammatically at 93 for completing a driving connection between the drive shaft or spindle 12 and the gear-box 92. The lathe 10 includes a conventional carriage 16 mounted on conventional ways 89 on the lathe bed 94 which has a conventional rack 95 thereon to be engaged by a pinion 96 mounted in the apron 97 of the carriage 16 and rotated by a drive means as a manually rotatable handwheel 18 for adjustably moving the carriage 16 relative to the bed of the lathe 10. Optionally a conventional half-nut 98 indicated diagrammatically in Figs. 1 and 4 is moved by manipulation of the clutch handle 99 to engage the lead screw 88 whereby the carriage 16 is then traversed longitudinally along the lathe bed 94 by lead screw rotation.

The invention consists of a pair of transverse frame members 22 and 24 which are secured to the carriage 16 from which the conventional cross-feed mechanism has been removed. Carried by the transverse frame members 22 and 24 are longitudinally extending frame members 26 and 28 which threadably adjustably support the concave holding brackets 30. Each of the four concave holding brackets 30 includes a flange 32 having a suitable aperture therethrough through which a bolt 34 may extend for securing the attaching plate 36 forming a part of the concave 38 to the bracket 30.

Spaced pairs of vertically extending angle iron frame members 40 are secured to transverse bars 41 secured to the lathe 10. A pair of transverse adjusting bars 42 are carried by the vertically extending frame members 40. As can be readily seen in Figure 3, the transverse adjusting bars 42 are each provided with an elongated central slot 44. The transverse bars 42 are channel shaped and are further provided with downwardly extending end walls 46 which are secured thereto in which suitable adjusting screws 48 are threadedly inserted for engagement with the vertically extending frame members 40. Thus, by use of the adjusting screws 48, the transverse bars 42 may be readily adjusted relative to the lathe. The bars 42 are held on the uprights 40 by both the action of gravity and by the frictional engagement of the screws 48 with the uprights 40. Extending downwardly through the slot 44 are threaded rods 50 which are adjustably locked in place by means of nuts 52. Secured to the rods 50 are bearing blocks 54 in which stub shafts 56 are journaled. Rigidly mounted on the stub shafts 56 and extending therebetween is a guide member 58 which includes spaced guide plates 60. The guide plates 60 are formed from angle iron and support therebetween a slide 62 from which depends the grinder 66. Depending from slide 62 is a shaft 64 below which there is secured the grinder 66 empowered by conductors 91. The shaft 64 is vertically adjustable relative to the slide 62 by means of lock nuts 68 which are threadedly engaged thereon. Vertically extending channel members 70 are secured to the plate 72 which is secured to the shaft 64 and from which the grinder 66 depends. The channel members 70 extend upwardly between the guide plates 60 and bolts 74 are provided for rigidifying the entire structure. The bolts 74 may be readily removed to permit travel by the slide 62 for longitudinal adjustment thereof.

Secured to one of the stub shafts 56 is a crank arm 76 to which there is rotatably mounted one end of a connecting rod 78. The other end of the connecting rod 78 is rotatably connected to a rotating drive member 80 which is rigidly mounted on shaft 82. The shaft 82 is journaled in the lathe 10 and is driven by a belt 84 which is connected to a pulley wheel 86 mounted on the shaft 12. Obviously, the belt 84 drives a suitable pulley wheel as designated by reference numeral 83. The pulley wheel 83 is rigidly mounted on the shaft 82.

In operation, with the concave 38 secured to the adjustable support 30, and with the shaft 12 rotating, the drive belt 84 will rotate the pulley wheel 83 and hence the shaft 82 which, in turn, will drive the drive arm 80. The rotation of the drive arm 80 will cause a rocking movement of the connecting rod 78 and hence operation of the crank arm 76. This, in turn, will cause a pendulous movement of the grinder 66 which, while engaging the transverse bars of the concave will grind them square. The grinder may be adjusted as to height above the concave by means of the shaft 64. It may be adjusted longitudinally relative to the work piece 38 by moving the carriage 16. Furthermore, the grinder may be adjusted longitudinally by moving the slide 62 longitudinally between the guide 60. In addition, the guides may be adjusted vertically by means of raising or lowering the threaded rods 50. The grinder may be adjusted transversely by moving the rods 50 within the slots 44.

Since from the foregoing, the construction and advantages of this device for reconditioning concaves of grain combines are readily apparent, further description is believed to be unnecessary.

However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is:

1. A grinding device including an elongated frame, a carriage mounted thereon, means for moving said carriage longitudinally along said frame, a vertically extending support means on said carriage to support work presenting surfaces to be ground which are defined by substantial coincidence with the inner surface of an imaginary cylinder having its axis thereabove and parallel to the longitudinal axis of said frame, journal means vertically adjustably mounted on said frame with axis parallel to the longitudinal axis of said frame, grinder support means extending axially longitudinally along said frame and having end shaft means journalled in said journal means, a power driven rotary grinder, a connection means carried by said grinder support means and mounting said grinder with axis of rotation parallel to said journal axis and adjustably transversely movable with relation to the axis of said grinder support means to adjust the distance from grinder to grinder support means, crank means mounted on said frame and connected to said shaft means for oscillatorily swinging said grinder in a grinding arc over said work surfaces, and power means for driving said crank means.

2. A grinding device as claimed in claim 1 in which said journal means is also transversely adjustably mounted on said frame.

3. A grinding device as claimed in claim 1 in which said connection means is longitudinally adjustably movable with relation to said grinder support means.

4. A grinding device as claimed in claim 1 in which said carriage moving means includes a handwheel.

5. A grinding device as claimed in claim 1 in which said power means also drives said carriage moving means.

6. The combination of a grinding attachment and a machine tool which includes an elongated frame, a carriage mounted thereon, means for moving said carriage longitudinally along said frame, and a power means, said grinding attachment including a vertically extending support means on said carriage to support work presenting surfaces to be ground which are defined by substantial coincidence with the inner surface of an imaginary cylinder having its axis thereabove and parallel to the longitudinal axis of said frame, journal means vertically adjustably mounted on said frame with axis parallel to the longitudinal axis of said frame, grinder support means extending axially longitudinally along said frame and having end shaft means journalled in said journal means, a power driven rotary grinder, a connection means carried by said grinder support means and mounting said grinder with axis of rotation parallel to said journal axis and adjustably transversely movable with relation to the axis of said grinder support means to adjust the distance from grinder to grinder support means, and crank means mounted on said frame and connected to said shaft means and driven by said power means to oscillatorily swing said grinder in a grinding arc over said work surfaces.

7. The combination of a grinding attachment and a machine tool as claimed in claim 6 in which said journal means is also transversely adjustably mounted on said frame.

8. The combination of a grinding attachment and a machine tool as claimed in claim 6 in which said connection means is longitudinally adjustably movable with relation to said grinder support means.

9. The combination of a grinding attachment and a machine tool as claimed in claim 6 in which said carriage moving means includes a handwheel.

10. The combination of a grinding attachment and a machine tool as claimed in claim 6 in which said power means also drives said carriage moving means.

References Cited in the file of this patent

UNITED STATES PATENTS

| | | |
|---|---|---|
| 462,394 | Cameron | Nov. 3, 1891 |
| 1,290,224 | Jones | Jan. 7, 1919 |
| 1,756,908 | Baumberger | Apr. 29, 1930 |
| 2,116,248 | Moser | May 3, 1938 |
| 2,130,627 | Kelly | Sept. 20, 1938 |
| 2,151,204 | Hartmann | Mar. 21, 1939 |
| 2,240,527 | Sunnen | May 6, 1941 |
| 2,380,335 | Schramm | July 10, 1945 |
| 2,456,827 | Greeley | Dec. 21, 1948 |
| 2,558,771 | Middaugh | July 3, 1951 |
| 2,683,341 | Koch | July 13, 1954 |

FOREIGN PATENTS

| | | |
|---|---|---|
| 17,872 | Great Britain | Aug. 18, 1903 |